Figure 1:
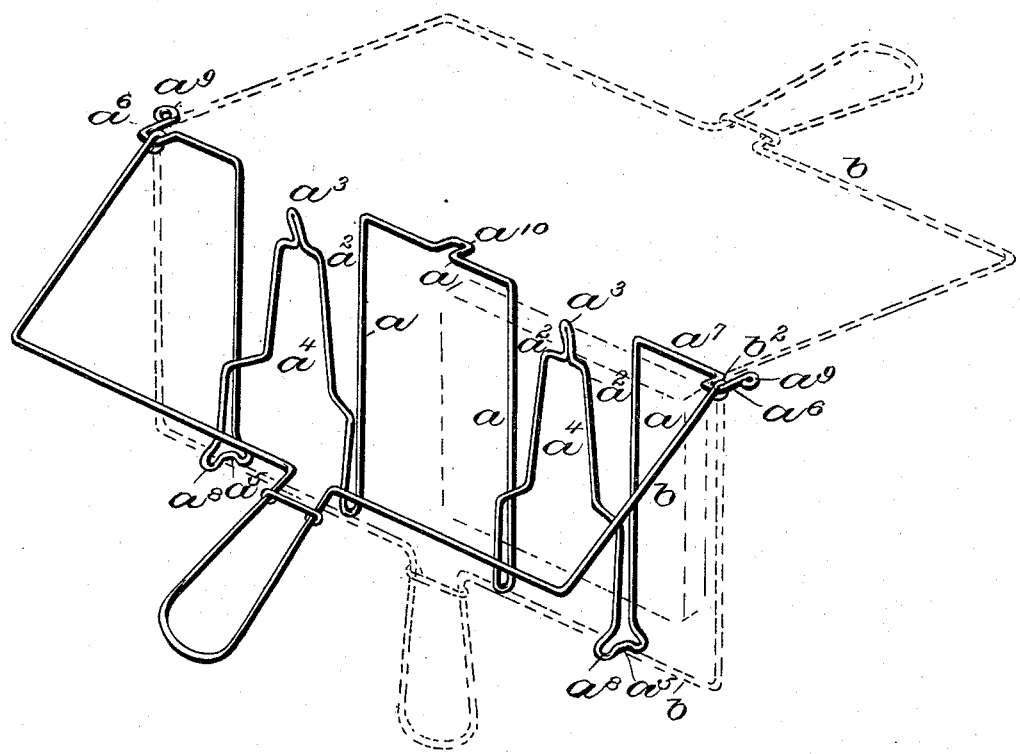

(No Model.)

E. WALL.
TOASTER OR BROILER.

No. 585,880. Patented July 6, 1897.

Witnesses

Inventor
Edwin Wall.
By
T. J. Geisler,
Attorney

UNITED STATES PATENT OFFICE.

EDWIN WALL, OF PORTLAND, OREGON.

TOASTER OR BROILER.

SPECIFICATION forming part of Letters Patent No. 585,880, dated July 6, 1897.

Application filed October 24, 1896. Serial No. 609,990. (No model.)

*To all whom it may concern:*

Be it known that I, EDWIN WALL, a citizen of the United States, residing at Portland, Multnomah county, State of Oregon, have invented a new and useful Toaster or Broiler, of which the following is a specification, reference being had to the accompanying drawings, as forming a part hereof.

The object of my invention is to obtain a toasting and broiling contrivance of simple and durable structure which may be cheaply made and sold. This end I have attained in the contrivance illustrated in the drawings, of which—

Figure 2:

Figure 1 represents a perspective elevation of my invention, and Fig. 2 is a detail thereof in side elevation.

The letters designate the parts referred to.

My invention is composed of two pieces, of which $a$ is the frame or main part, and $b$ the handle, all constructed of wire. The grade of wire I have advantageously used for this purpose is medium spring-wire of about one-eighth of an inch diameter. This wire is bent in the form illustrated, so as to provide the arms $a^7$, the feet $a^5$, and the clamps $a^4$, the latter having shoulders $a^2$ and tongues $a^3$. At the extremities of the arms $a^7$ I have provided ears $a^6$, projecting at right angles to the standards of my device, and to such ears I attach the handle $b$. The latter consists of a bail, the free ends of which are bent around to form eyes $b^2$, secured on the ears $a^6$ and the grip-piece $b^3$. The ears $a^6$ are so constructed as to bring the handle-joint about centrally between the back and the clamps of the frame. This enables the handle to be readily turned from one side to the other to expose both sides of the toasting article, and it also enables the handle to be brought down parallel with the frame, and so convert my invention into a flat broiler. For this purpose the arms $a^7$ are drawn down to bring the bail between the toes $a^8$ of the feet $a^5$, and the reflection of the arms to their normal position firmly holding the handle in place.

My invention may thus be used in three ways: by standing the same on its feet to toast before the fire, by placing same on the stove to toast or broil over the fire, and by holding and manipulating same by the handle. By reason of my contrivance being adapted to support in a vertical position the toasting or broiling article can be readily adjusted, being either placed in the frame or hung from the tongues $a^3$. To give the clamps $a^4$ better grip, the upper part thereof is somewhat inclined toward the frame. This insures the holding of the article should the same be thinner than the intervening space between the clamps and the back of the frame. Small pieces of meat may be hung from the tongues $a^3$, so as to hang against the clamps.

The projections $a^9$ $a^{10}$ constitute toes for sufficiently elevating the frame to keep the toasting or broiling article off the stove when the frame is placed flat on its back.

My invention is especially adapted for bread-toasting.

The points of the tongues $a^3$ are turned outward, so as to enable the article to be toasted or broiled to be easily inserted in place without requiring the handling of the frame by the fingers after such frame has become heated.

The brace $b^4$ is provided to strengthen the handle.

Now what I claim is—

1. As a broiling and toasting device, a frame, $a$, constructed of wire of suitable elasticity and strength, and comprising a back, the frontal clamps, $a^4$, provided with tongues, $a^3$, for the purpose specified, and suitable feet on which to stand the frame; and a bail, or handle, $b$, loosely attached to such frame, substantially as set forth.

2. As a broiling and toasting device, a frame, $a$, constructed of wire of suitable elasticity and strength, and comprising a back, the frontal clamps, $a^4$, the feet, $a^5$, on which to stand the frame, the arms, $a^7$, and a bail, or handle, hung from their extremity, the arms, $a^7$, being flexible, and the feet, $a^5$, provided with protruding toes, leaving a depression between them, so that the bail or handle may be drawn over and held on the feet, for the purposes specified, substantially as set forth.

3. As a broiling and toasting device, a frame, $a$, constructed of wire of a suitable elasticity and strength, and comprising a back, the frontal clamps, $a^4$, the feet, $a^5$, on which to stand the frame, and the arms, $a^7$, having ears, $a^6$, at their extremities, to which is attached a bail, or handle, $b$; such ears extending horizontally, and being so constructed as to bring the handle-joint about centrally between the back and clamps of the frame, substantially as and for the purpose set forth.

4. As a broiling and toasting device, a frame, $a$, constructed of wire of suitable elasticity and strength, and consisting of a back, the frontal clamps, $a^4$, the feet, $a^5$, on which to stand the frame, and the arms, $a^7$, having ears at their extremities, and a bail or handle $b$, hung therefrom; and the back of the frame being provided with studs, $a^9$ and $a^{10}$, substantially as and for the purposes set forth.

In testimony whereof I have hereunto set my hand this 30th day of September, 1896.

EDWIN WALL.

In presence of—
  E. D. TIMMS,
  T. J. GEISLER.